United States Patent
Henning

[19]

[11] Patent Number: 5,837,980
[45] Date of Patent: Nov. 17, 1998

[54] MICROWAVE OVEN ROTISSERIE AND STIRRING APPARATUS

[76] Inventor: Jeffrey D. Henning, 4609 Penzance Pl., Upper Marlboro, Md. 20772

[21] Appl. No.: 503,476

[22] Filed: Jul. 18, 1995

[51] Int. Cl.⁶ .................................................. H05B 6/78
[52] U.S. Cl. .................... 219/753; 219/752; 219/732; 219/762; 99/421 H; 99/DIG. 14
[58] Field of Search ....................................... 219/732, 752, 219/753, 762, 763; 99/421 R, 421 H, 421 HH, DIG. 14

[56] References Cited

U.S. PATENT DOCUMENTS

| | | | |
|---|---|---|---|
| 1,337,122 | 4/1920 | Doak | 99/345 |
| 2,787,948 | 4/1957 | Mathis | 99/421 TP |
| 2,845,856 | 8/1958 | Sack | 99/421 R |
| 4,074,102 | 2/1978 | Asen | 219/732 |
| 4,571,474 | 2/1986 | Pomroy . | |
| 4,659,890 | 4/1987 | Viet | 219/753 |
| 4,714,813 | 12/1987 | Trenchard . | |
| 4,717,802 | 1/1988 | Colato . | |
| 4,810,856 | 3/1989 | Jovanovic | 99/421 H |
| 4,822,967 | 4/1989 | Kumagami et al. | 219/753 |

*Primary Examiner*—Philip H. Leung
*Attorney, Agent, or Firm*—Foley & Lardner

[57] ABSTRACT

Portable apparatus for use in a microwave oven removably supports and rotates a food treatment attachment simultaneously about first and second orthogonally related axes within the oven. A wheel of the apparatus frictionally engages the oven floor as the apparatus is rotated by the turntable drive mechanism of the oven. Rotation of the friction wheel imparts rotational movement to a food treatment attachment so that the attachment is simultaneously rotated about first and second orthogonally related axes.

17 Claims, 6 Drawing Sheets

MICROWAVE OVEN ROTISSERIE AND STIRRING APPARATUS

BACKGROUND OF THE INVENTION

This invention relates to microwave ovens and more particularly to a portable rotisserie or stirring apparatus for turning or stirring food products in a microwave oven.

Microwave ovens are widely used for cooking or heating food products quickly and efficiently. One problem with microwave ovens, however, is uneven heating or cooking of foods because of non-uniform microwave distribution within the oven cavity. Turntables are often used in microwave ovens to rotate the food horizontally about a vertical axis to heat or cook the food more uniformly.

Because non-uniformities in microwave energy within the oven cavity exist vertically as well as horizontally, the vertical non-uniformities can produce uneven cooking of foods even though the foods are rotated horizontally by a turntable.

It is, therefore, an object of the present invention to provide apparatus for removably supporting and rotating a food treatment attachment simultaneously about first and second orthogonally related axes within a microwave oven.

Another object is to provide such apparatus which is portable and which can be quickly and easily inserted or removed from a microwave oven.

A further object of the invention is the provision of such apparatus for use with a food treatment attachment which acts as a rotisserie.

Still another object is to provide such apparatus which can be used with a food treatment attachment which acts as a food stirrer.

Another object is to provide such apparatus which simultaneously rotates a food treatment attachment about vertical and horizontal axes by use of a friction wheel which engages the floor of the microwave.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides apparatus for removably supporting and rotating a food treatment attachment simultaneously about first and second substantially orthogonally related axes within a microwave oven having a turntable drive mechanism and defining a floor, the apparatus comprising: a base defining first and second openings therein, the base removably positionable within the microwave oven to be rotated about the first axis by the drive mechanism; first means removably attachable to the base and within the first opening in predetermined contacting relationship with the floor for removably supporting and rotating the food treatment attachment about the second axis as the base and the first means are rotated together about the first axis by the drive mechanism; and second means removably attachable to the base for removably supporting the food treatment attachment: as the food treatment attachment is rotated about the second axis and as the base is rotated about the first axis by the drive mechanism.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate examples of preferred embodiments of the invention and, together with the description, serve to explain the principles of the invention.

DESCRIPTION OF THE PREFERRED EMBODIMENTS

Figure 1:
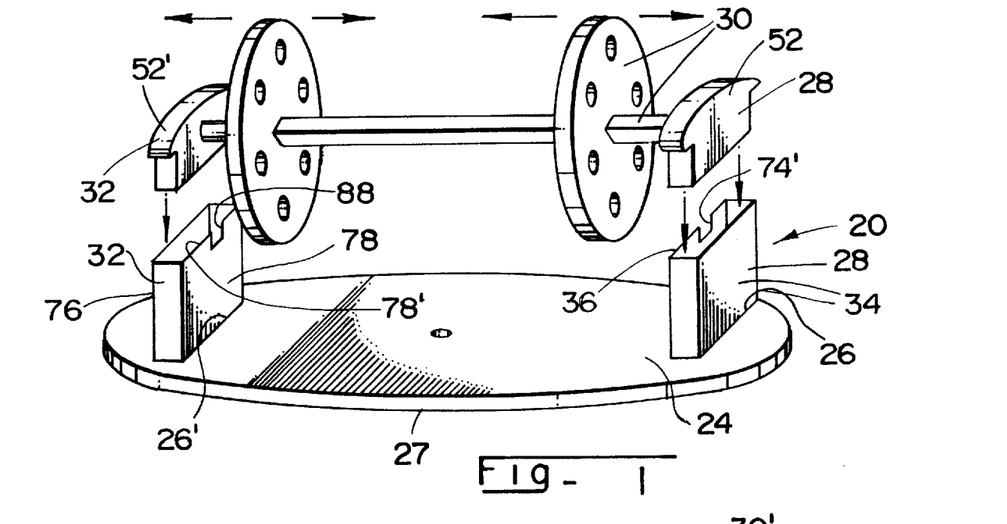
FIG. 1 is a diagrammatic perspective view showing a preferred invention embodiment.
Figure 2:
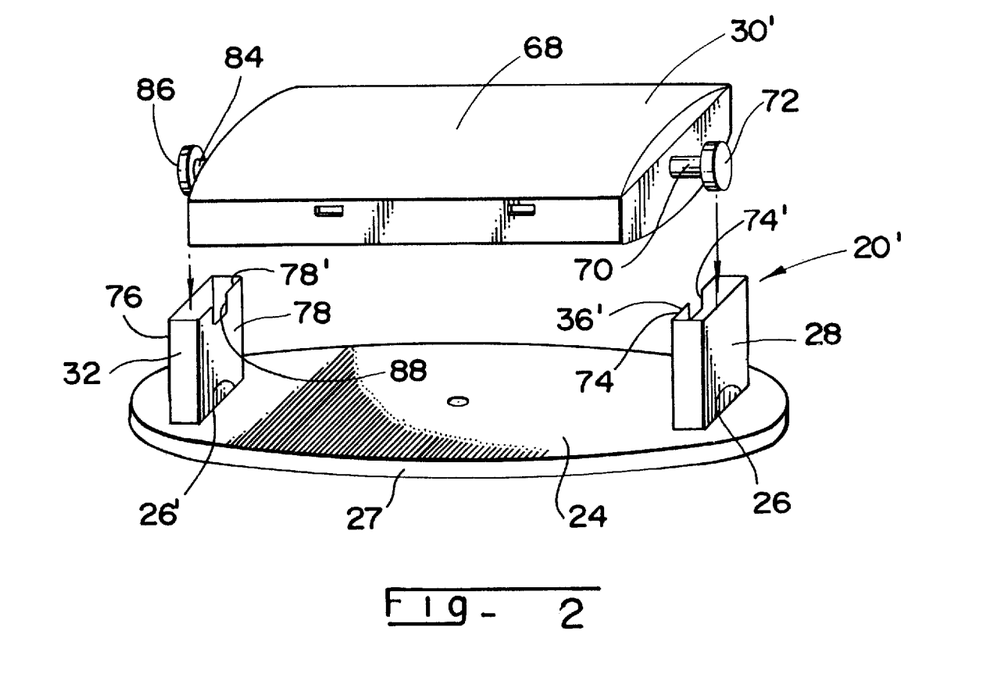
FIG. 2 is a diagrammatic perspective view showing another preferred invention embodiment.
Figure 5:
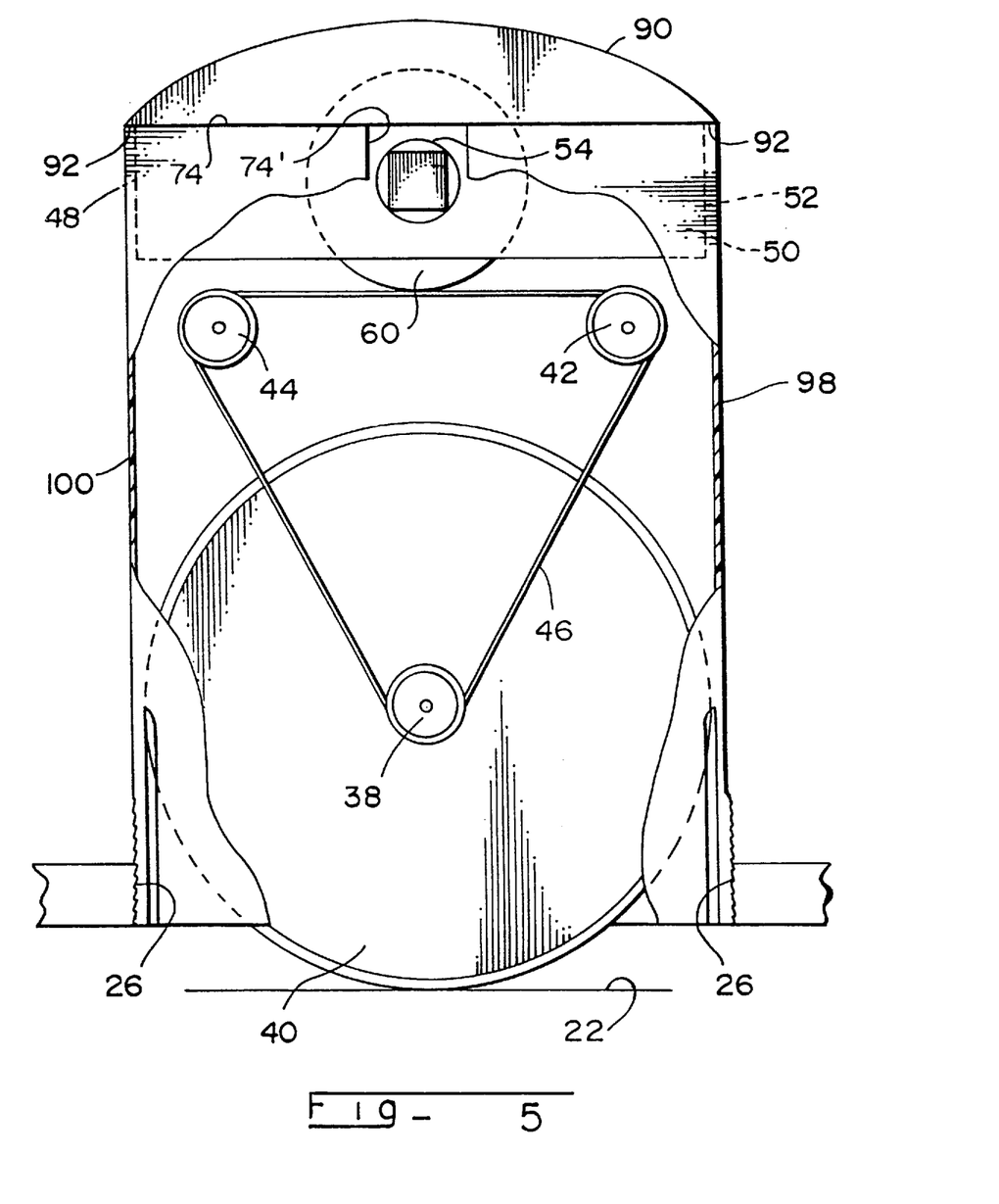
FIG. 5 is a fragmentary elevational view of the support shown in FIG. 3 and showing the support attached to a rotatable base of the microwave oven.

With reference now to the drawings, wherein like reference characters designate like or corresponding parts throughout the several views, there are shown in FIGS. 1 and 2 two embodiments 20, 20' of apparatus according to this invention. Apparatus embodiments 20, 20' removably support and rotate a food treatment attachment simultaneously about first and second orthogonally related axes within a microwave oven (not shown) having a conventional turntable mechanism (not shown) and defining a floor 22 (see FIG. 5).

Apparatus embodiments 20, 20' each includes a base 24 defining first and second openings 26, 26' therein. Base 24 is preferably a circular disk and it is removably positionable within a microwave oven (not shown) to be rotated about a first, vertical axis by the conventional drive mechanism (not shown) of the oven. openings 26, 26' are preferably formed as holes in base 24 having perimeters formed by base 24 which completely enclose the holes. Alternatively, openings 26, 26' can be formed as notches or cut-away portions at perimeter 27 of base 24.

Apparatus embodiments 20, 20' each further includes first means 28 removably attachable to base 24 and within first opening 26 in contacting relationship with floor 22 of the oven for removably supporting and rotating a food treatment attachment 30, 30' about a second, horizontal axis as base 24 and first means 28 are rotated together about the first, vertical axis by the oven drive mechanism (not shown).

In accordance with the invention, apparatus embodiments 20, 20' each includes second means 32 removably attachable to base 24 for removably supporting food treatment attachment 30, 30' as the attachment is rotated about the second, horizontal axis and as base 24 is rotated about a first, vertical axis by the oven drive mechanism. Second means 32 is attachable to base 24 within second opening 26' and in preferably contacting relationship with floor 22.

Although not described in detail herein, food treatment attachments 30, 30' (FIGS. 1 and 2) and other attachments (not shown) can be used to hold various types of foods or for stirring or mixing foods.

In accordance with the invention, first means 28 include a lower portion comprised of first and second opposed supports 34, 36 (see FIG. 3) which are connected together and which define upper portions 34', 36', respectively. The lower portion of first means 28 further include a first axle 38 rotatably extending between and supported by supports 34, 36. A first wheel 40 is rigidly mounted on axle 38 and extends through first opening 26 in contacting frictional engagement with floor 22 when the lower portion of first means 28 is removably attached to base 24. The lower portion of first means 28 further includes first and second bearing elements 42, 44 extending between and supported by supports 34, 36 above axle 38 and in side-by-side, spaced-apart relationship with each other.

Figure 3:
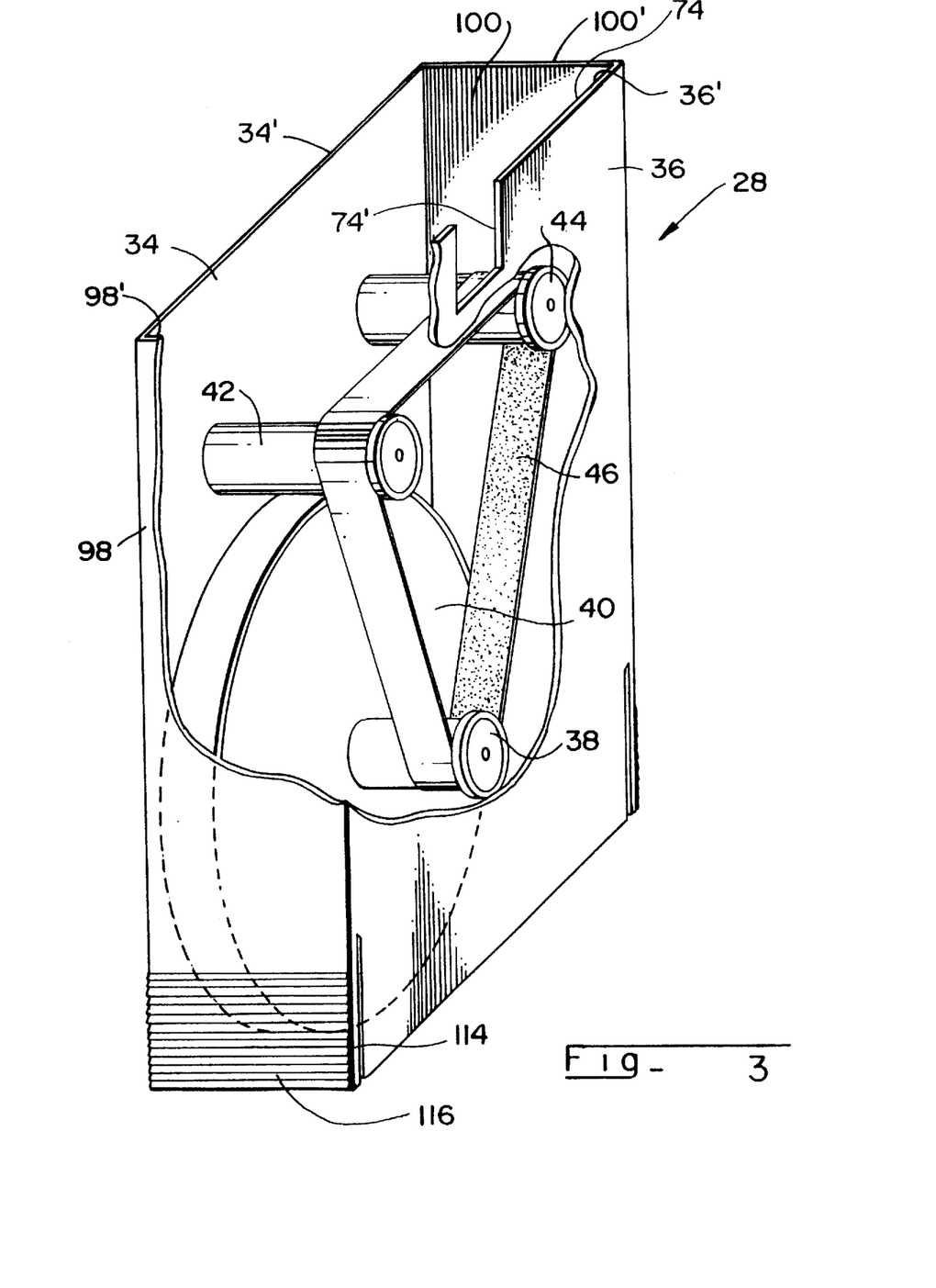
FIG. 3 is a fragmentary perspective view showing a first support used in the preferred invention embodiments.

The lower portion of first means 28 also includes a belt 46 which extends around and frictionally engages axle 38 and bearing elements 42, 44. Rotation of axle 38, caused by rotation of wheel 40 in frictional contact with floor 22 as base 24 is rotated about a first, vertical axis by the oven drive mechanism (not shown), causes rotational movement of belt 46 over axle 38 and over bearing elements 42, 44.

Figures 6, 6A:
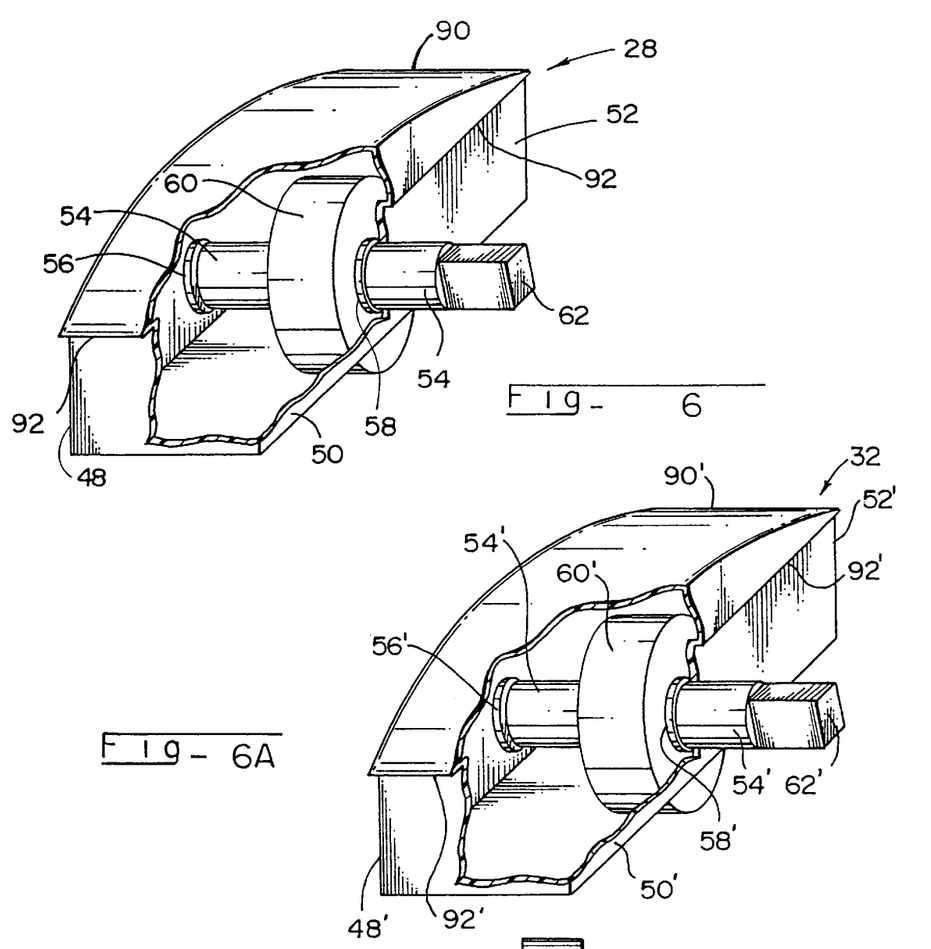
FIG. 6 is a fragmentary perspective view of an assembly to be mounted on the support shown in FIG. 3.
FIG. 6A is a fragmentary perspective view of an assembly to be mounted on the support shown in FIG. 4.

In embodiment 20 of the apparatus of this invention (FIGS. 1 and 6) first means 28 further include an upper portion comprised of third and fourth opposed supports 48, 50 connected together to comprise an assembly 52 (see FIGS. 1 and 6). Upper portion of first means 28 in apparatus 20 further includes a second axle 54 rotatably extending between and supported by supports 48, 50. Axle 54 extends through support 50. Bearings 56, 58 support axle 54 within supports 48, 50, respectively.

A second wheel 60 is rigidly mounted on axle 54, and assembly 52 and wheel 60 are of predetermined configurations and dimensions for enabling assembly 52 to be removably positioned on upper portions 34', 36' of supports 34, 36 with axle 54 within notch 74' when wheel 60 rests on and frictionally engages belt 46 to be rotated by moving belt 46.

Figure 7:
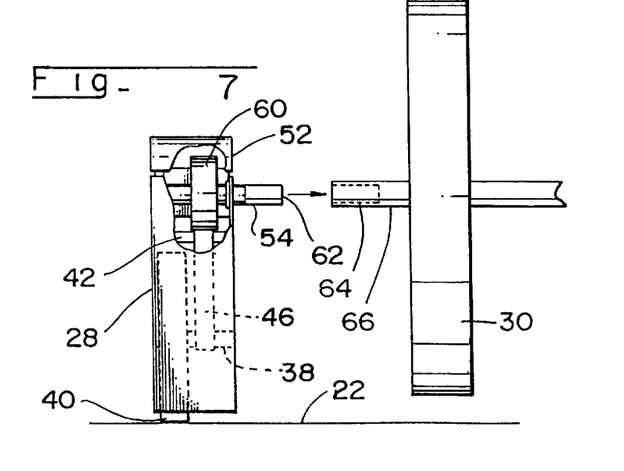
FIG. 7 is a fragmentary and diagrammatic elevational view showing a food treatment attachment in relationship with the assembly shown in FIG. 6 and with the support shown in FIG. 3.

In accordance with the invention, axle 54 is configured to be removably connectable to a food treatment attachment, such as attachment 30. Distal end 62 of axle 54 may be square in cross-sectional shape, for example, to slideably fit within a cavity 64 having a square cross-sectional configuration within shaft 66 of a food treatment attachment, such as 30. (See FIG. 7.) Various other conventional configurations may be used to removably connect axle 54 to different food treatment attachments.

In apparatus embodiment 20' (FIG. 2) food treatment attachment 30' includes a food carrying element 68. A first rod 70 is attached to food carrying element 68 and projects outwardly therefrom. A wheel 72 is rigidly mounted on rod 70 for removably resting on and frictionally engaging belt 46 to be rotated by moving belt 46.

Upper portion 36' of support 36 includes an upper edge 74 which defines a square-shaped notch 74' within upper edge 74 for removably receiving first rod 70 within notch 74'. Movement of rod 70 is laterally restricted by notch 74' as rod 70 and wheel 72 are rotated by wheel 72 frictionally contacting moving belt 46.

Figure 4:
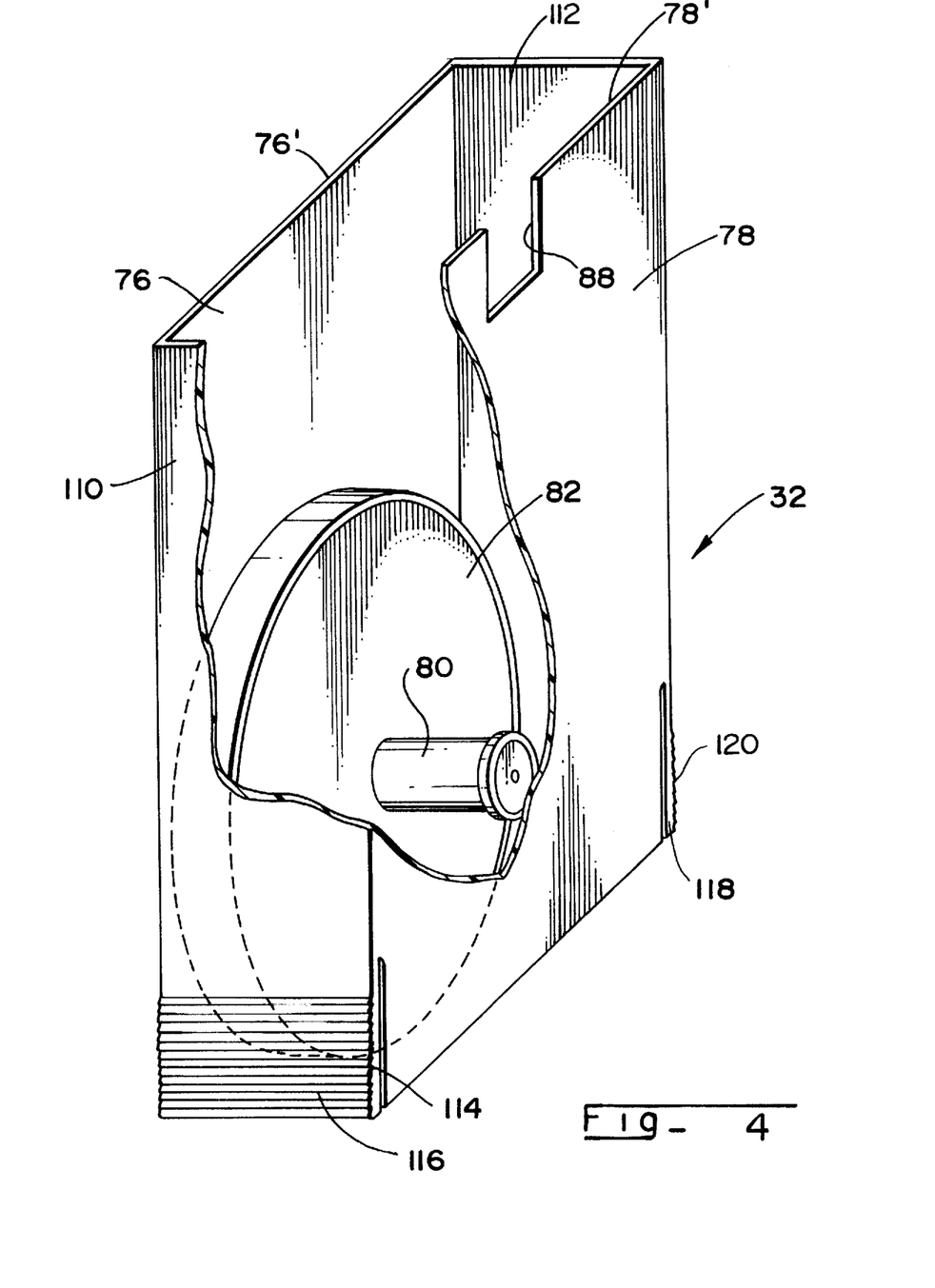
FIG. 4 is a fragmentary perspective view showing a second support used in the preferred invention embodiments.

Lower portions of second means 32 in apparatus embodiments 20, 20' each preferably includes first and second support elements 76, 78 connected together and defining upper edge portions 76', 78'. An axle 80 preferably extends between and is supported by support elements 76, 78. A wheel 82 is preferably mounted on axle 80 and extends through second opening 26' in base 24 in frictional contacting engagement with floor 22 when second means 32 is removably attached to base 24. (See FIG. 4.)

In accordance with the invention, upper portion of second means 32 in apparatus embodiment 20 (FIGS. 1 and 6A) further includes opposed supports 48', 50' connected together to comprise an assembly 52'. An axle 54' rotatably extends between and is supported by supports 48', 50' and axle 54 extends through support 50'. Assembly 52' is substantially identical to assembly 52 and is of predetermined configuration and dimensions for enabling assembly 52' to be removably positioned onto upper edge portions 76', 78' of support elements 76, 78 with axle 54' within notch 88.

As previously described with respect to axle 54 and distal end 62 of axle 54, axle 54' and distal end 62' of axle 54' are configured to be removably connectable to food treatment attachment 30 or the like.

In embodiment 20' of the apparatus (FIG. 2), food treatment attachment 30' or the like includes food carrying element 68 as previously described. A rod 84 is attached to food carrying element 68 and projects outwardly therefrom. A wheel 86 is rigidly mounted on rod 84.

Upper edge portion 78' of support element 78 (see FIGS. 2 and 4) includes an upper edge which defines a square-shaped notch 88 therein for removably receiving rod 84 within notch 88 so that lateral movement of rod 84 is restricted by notch 88.

In the apparatus embodiment 20 (FIG. 1), assembly 52 preferably further includes a cover 90 connected to supports 48, 50, and cover 90 preferably defines at least one flange 92. (See FIGS. 5 and 6.) Flange 92 may extend completely around cover 90, or flange 92 may be provided only at opposite ends of cover 90 to form two separate flanges. In accordance with the invention, supports 48, 50 and cover 90 are of predetermined configurations and dimensions for enabling assembly 52 to slideably fit within supports 48, 50 with flange 92 resting on upper portions 34', 36' of supports 34, 36 with wheel 60 frictionally engaging belt 46 to be rotated by moving belt 46. Supports 48', 50' and cover 90' of assembly 52' are also of predetermined configurations and dimensions for enabling assembly 52' to slideably fit within support elements 76, 78 with flange 92' resting on upper edge portions 76', 78' of support elements 76, 78.

When assemblies 52, 52' are respectively positioned onto supports 34, 36 and onto support elements 76, 78 as described above, axles 54, 54' of assemblies 52, 52' will be positioned within notches 74', 88, respectively.

Figure 8:
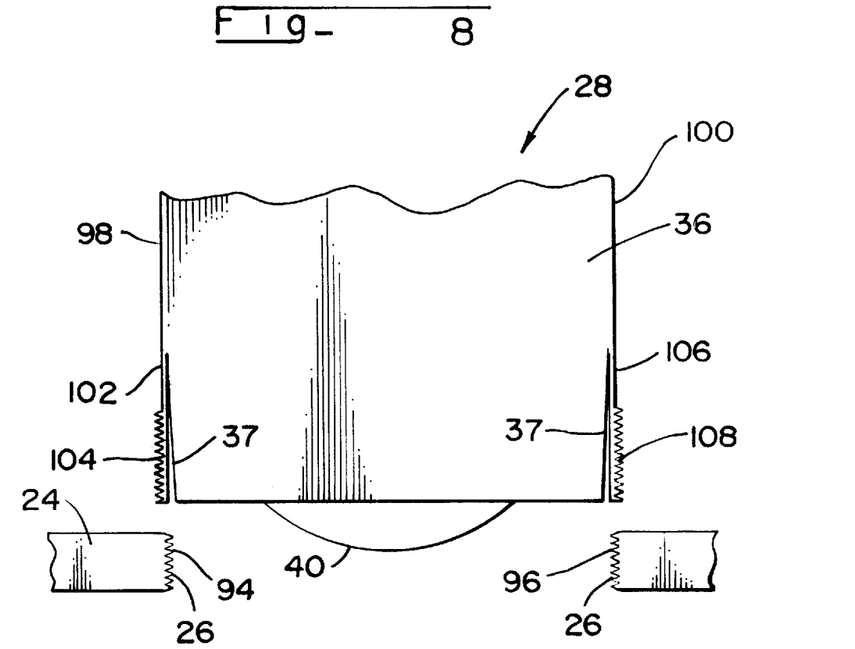
FIG. 8 is a fragmentary elevational view showing the relationship between the support shown in FIG. 3 and a rotatable base of the microwave oven.

In each of apparatus embodiments 20, 20', each of first and second openings 26, 26' within base 24 defines first and second opposed serrated edges. First and second opposed serrated edges 94, 96 of opening 26 are shown in FIG. 8. The opposed serrated edges of opening 26' are identical to those of opening 26.

In accordance with the invention, first and second opposed connecting elements 98, 100 extend between and connect together first and second supports 34, 36. (See FIGS. 3, 8 & 9.) A first arm member 102 is flexibly and resiliently connected to first connecting element 98 and defines a first serrated surface 104 for removably engaging first serrated edge 94 of first opening 26 when first means 28 is within first opening 26.

Figure 9:
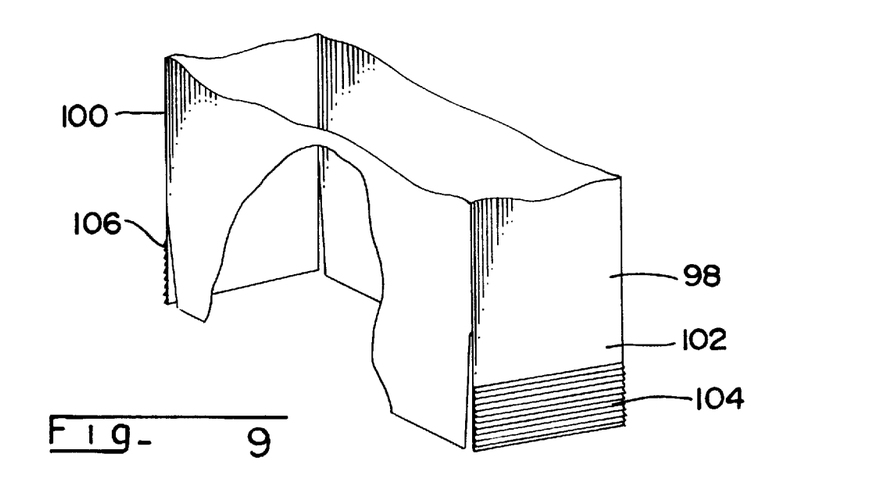
FIG. 9 is a fragmentary perspective view of the support shown in FIG. 3.

A second arm member 106 is flexibly and resiliently connected to second connecting element 100 and defines a second serrated surface 108 for removably engaging second serrated edge 96 of first opening 26 when first means 28 is within first opening 26.

Each of apparatus embodiments 20, 20' further includes third and fourth opposed connecting elements 110, 112 extending between and connecting together support elements 76, 78. (See FIG. 4.) A third arm member 114 is flexibly and resiliently connected to connecting element 110 and defines a third serrated surface 116 for removably engaging a first serrated edge (not shown) of second opening 26' when second means 32 is within second opening 26'. Similarly, a fourth arm member 118 is flexibly and resiliently connected to fourth connecting element 112 and defines a fourth serrated surface for removably engaging a second serrated edge (not shown) of second opening 26' when second means 32 is within second opening 26'.

Lower portions of each of supports 34, 36 and support elements 76, 78 are preferably beveled inwardly adjacent to arm members 102, 106, 114 and 118 to permit pressing and releasing of the arm members to respectively cause serrated surfaces 104, 108, 116 and 120 of the arm members to be released from engagement with the serrated edges of openings 26, 26' or to engage the serrated edges of openings 26, 26'. FIG. 8 shows lower beveled portions 37 of support 36. Alternatively, the width of each of arm members 102, 106, 114 and 118 can be less than the width of connecting elements 98, 100, 110 and 112, respectively, so that the arm members can be pressed inwardly to release serrated surfaces 104, 108, 116 and 120 from engagement with the serrated edges of openings 26, 26'. The resilience of the arm members causes them to spring into engaging relationship with the serrated edges of openings 26, 26' when the arm members are released from manual pressure.

Belt 46 is preferably comprised of neoprene and has a polyurethane coating to provide increased friction. Each of wheels 40, 82 is preferably coated with polyurethane to provide increased friction with floor 22. Wheel 72 and 86 may also be coated with polyurethane to provide increased friction with belt 46.

In operation and use of apparatus embodiment 20 (FIG. 1), base 24 is removably positioned onto the conventional drive mechanism (not shown) of the microwave oven (not shown) in the same manner as a conventional microwave turntable is positioned on the drive mechanism. The lower portion of first means 28 is then removably attached to base 24 with serrated surface 104 of arm member 102 removably engaging and gripping serrated edge 94 of opening 26. (See FIG. 8.) Serrated surface 108 of arm member 106 also removably grips and engages serrated edge 96 of opening 26. The lower portion of first means 28 is moved into opening 26 and downwardly therethrough until wheel 40 engages floor 22 of the microwave oven. (See FIG. 5.)

Arm members 102, 106 are manually pressed inwardly as first means 28 is lowered into and through opening 26. When wheel 40 contacts floor 22, manual pressure on arms 102, 106 is released so that serrated surface 104 engages serrated edge 94 and serrated surface 108 engages serrated edge 96. The lower portion of second means 32 is similarly positioned within opening 26' with wheel 82 engaging floor 22 of the oven.

Food treatment attachment 30, for example, can then be removably connected to axles 54, 54' of assemblies 52, 52', respectively. Assembly 52 is then lowered and slideably positioned between supports 34, 36 with flange 92 engaging and resting on upper edge portions 34', 36' and/or on upper edge portions 98', 100' of connecting elements 98, 100.

Assembly 52 is configured and of suitable dimensions so that wheel 60 of assembly 52 will rest on and frictionally engage belt 46 when flange or flanges 92 engage and rest on upper edge portions 34', 36' and/or 98', 100'.

Simultaneously with the positioning of assembly 52, assembly 52' can be similarly positioned within and onto support elements 76, 78 and connecting elements 110, 112 of second means 32. Because no belt is contained within second means 32, wheel 60' of assembly 52' does not engage any belt and does not engage wheel 82.

If food treatment attachment 30 or other food treatment attachments are designed to permit them to be connected to assemblies 52, 52' after assemblies 52, 52' have been positioned onto the lower portions of first means 28 and second means 32, as described above, then attachment 30 or other food treatment attachments would preferably be removably connected to assemblies 52, 52' after the assemblies have been positioned onto the lower portions of first means 28 and second means 32.

When it is desired to heat or cook a food product within the microwave oven, the food product is positioned onto food treatment attachment 30, for example. The microwave oven is then activated in a conventional manner to cause activation of the conventional oven drive mechanism. This, in turn, causes rotation of base 24 about a vertical axis. As base 24 rotates about a vertical axis, wheel 40 is rotated by engagement with floor 22 of the oven. Rotation of wheel 40 causes rotation of axle 38. Belt 46, in turn, is rotated by the rotation of axle 38, and belt 46 moves around and over bearing elements 42, 44. The movement of belt 46 causes rotation of wheel 60 in assembly 52, and axle 54 is rotated to cause rotational movement of food treatment attachment 30 about a horizontal axis.

In the preferred embodiment illustrated, movement of axle 54 and of food treatment attachment 30 causes movement of axle 54' in assembly 52'. Wheel 60' rotates freely as a result of the rotational movement of axle 54'. An alternative embodiment of the invention (not shown) could eliminate wheel 60' from assembly 52' and could simply provide for axle 54' to be rotatably connected to support 50' of assembly 52'.

Another alternative embodiment of the invention (not shown) could provide for the upper portion of second means 32 to be identical to the upper portion of first means 28 so that wheel 60' of assembly 52' would rest on and engage a belt in the upper portion of second means 32 similar to belt 46 in the upper portion of first means 28. In this configuration, rotational forces would be applied through axles 54, 54' to both ends of food treatment attachment 30.

Various types and configurations of food treatment attachments 30 could be used for the purpose of rotating or stirring various types of food products within the microwave oven.

In operation and use of apparatus embodiment 20' (FIG. 2), base 24 is removably positioned onto the conventional drive mechanism of the microwave oven and lower portions of first means 28 and second means 32 (without assemblies 52, 52') are removably positioned and connected to base 24 in the same manner as previously described with respect to apparatus embodiment 20.

Food treatment attachment 30', for example, is then lowered into position with wheel 72 resting on and frictionally engaging belt 46. Notch 74' is located to receive rod 70 therein. Simultaneously, rod 84 is positioned within notch 88, and notches 74', 88 restrict lateral movement of rods 70, 84, respectively.

When the microwave oven is activated in the conventional manner to cause activation of the oven drive mechanism, base 24 is rotated about a vertical axis, and belt 46 is rotated in the same manner as previously described with respect to apparatus embodiment 20. Rotation of belt 46, in turn, causes rotation of wheel 72, which rests on belt 46. As a result, rod 70 is rotated and food carrying element 68 is rotated about a horizontal axis. Rod 84 will also be rotated about a horizontal axis within notch 88. Various configurations of food carrying element 68 could be used for the purpose of holding various types of food products.

An important feature of each of the embodiments of this invention is the provision for adjusting the speed of rotation about the first and second orthogonally related axes.

The adjustment of rotational speed about the first axis can be accomplished by providing enlarged openings 26, 26' in a generally radial direction with respect to the first axis to enable supporting means 28, 32 to be mounted within openings 26, 26', respectively, at varying distances from the first axis. Serrated edges 94, 96 of opening 26, and the corresponding serrated edges (not shown) of opening 26', are extended along the entire generally radial dimensions of enlarged openings 26, 26'. This enables serrated surfaces 104, 108 of supporting means 28 to slide in a generally radial direction with respect to serrated edges 94, 96 so that support means 28 can be adjusted closer to or further away from the first axis. A similar arrangement also allows support means 32 to be similarly adjusted in position within opening 26' with respect to the first axis. As an alternative, a plurality of additional discrete generally radially separated openings (not shown) can be provided in base 24, in addition to openings 26, 26', to enable support means 28, 32 to be mounted at various distances from the first axis. Different lengths or adjustable length attachments 30, 30' can be provided to accommodate the different spacings resulting between supporting means 28 and 32 as supporting means 28, 32 are repositioned within openings 26, 26'. Attachments 30, 30' can be made adjustable by making axle 54 and rod 70 adjustable in length in a conventional manner, as by providing telescoping sections for example.

The adjustment of rotational speed about the second axis can be accomplished by changing the diameters of wheels 60, 72. The diameters of wheels 60, 72 that are used depend on the desired frequency of rotation about the second axis. Wheels 60, 72 are preferably detachable in a conventional manner from axle 54 and from rod 70, respectively, so that different sizes of wheels 60, 72 can be used.

The invention in its broader aspects is not limited to the specific details shown and described, and departures may be made from such details without departing from the principles of the invention and without sacrificing its chief advantages.

What is claimed is:

1. Apparatus for removably supporting and rotating a food treatment attachment simultaneously about first and second substantially orthogonally related axes within a microwave oven having a turntable drive mechanism and defining a floor, said apparatus comprising:

a base in the form of a substantially circular disk defining first and second openings therein, said base removably positionable within said microwave oven to be rotated about said first axis by said drive mechanism;

a first removable support attachable to said base and within said first opening in predetermined contacting relationship with said floor removably supporting and rotating said food treatment attachment about said second axis as said base and said first support are rotated together about said first axis by said drive mechanism;

said first removable support having first and second opposed supports connected together and defining upper portions;

a first axle rotatable extending between said first and second opposed supports;

a first wheel rigidly mounted on said first axle and extending through said first opening in contacting engagement with said floor when said first removable support is removably attached to said base;

first and second bearing elements extending between said first and second opposed supports above said first axle and in substantially side-by-side, spaced-apart relationship with each other; and a belt extending around and engaging said first axle and said first and second bearing elements, whereby rotation of said first axle caused by rotation of said first wheel in contact with said floor as said base is rotated about said first axis by said drive mechanism causes rotational movement of said belt over said first axle and over said first and second bearing elements; and a second removable support attachable to said base within said second openings in predetermined contacting relationship with said floor and removably supporting said food treatment attachment as said food treatment attachment is rotated about said second axis and as said base is rotated about said first axis by said drive mechanism.

2. Apparatus as in claim 1 wherein said first removable support further include:

third and fourth opposed supports connected together to comprise an assembly;

a second axle rotatably extending between said third and fourth supports and through said fourth support;

a second wheel rigidly mounted on said second axle;

said assembly and said second wheel of predetermined configurations and dimensions for enabling said assembly to be removably positioned on said upper portions of said first and second supports when said second wheel rests on and frictionally engages said belt to be rotated by said moving belt.

3. Apparatus as in claim 2 wherein said second axle is removably connectible to said food treatment attachment.

4. Apparatus as in claim 2 wherein said assembly further includes:

a cover connected to said third and fourth supports, said cover defining a flange;

said third and fourth supports and said cover of predetermined configurations and dimensions for enabling said assembly to slideably fit within said first and second supports with said flange resting on said upper portions of said first and second supports and with said second wheel frictionally engaging said belt to be rotated by said moving belt.

5. Apparatus as in claim 1 wherein said food treatment attachment includes:

a food carrying element;

a first rod attached to said food carrying element and projecting outwardly therefrom; and a second wheel rigidly mounted on said first rod for removably resting on and frictionally engaging said belt to be rotated by said moving belt.

6. Apparatus as in claim 5 wherein said upper portion of said second support includes an upper edge defining a substantially square-shaped notch within said upper edge for removably receiving said first rod within said notch, whereby movement of said first rod is restricted by said notch as said rod and said second wheel are rotated by said moving belt.

7. Apparatus as in claim 1 wherein said second removable support include:

first and second opposed support elements connected together and defining upper edge portions;

a second axle extending between said first and second support elements; and     a second wheel mounted on said second axle and extending through said second opening in contacting engagement with said floor when said second removable support is removably attached to said base.

8. Apparatus as in claim 7 wherein said second removable support further include:

third and fourth opposed supports connected together to comprise an assembly;

a third axle rotatably extending between said third and fourth supports and through said fourth support; and     said assembly of predetermined configuration and dimensions for enabling said assembly to be removably positioned onto said upper edge portions of said first and second support elements.

9. Apparatus as in claim 8 wherein said third axle is removably connectible to said food treatment attachment.

10. Apparatus as in claim 7 wherein said food treatment attachment includes:

a food carrying element;

a first rod attached to said food carrying element and projecting outwardly therefrom; and     a third wheel mounted on said first rod.

11. Apparatus as in claim 10 wherein said upper edge portion of said second support element includes an upper edge defining a substantially square-shaped notch as part of said upper edge for removably receiving said first rod within said notch, whereby movement of said first rod is restricted by said notch.

12. Apparatus as in claim 7 wherein said upper portion of said second support and said upper edge portion of said second support element each defines a substantially square-shaped notch therein.

13. Apparatus as in claim 7 wherein each of said first and second wheels is coated with polyurethane to provide increased friction with said floor.

14. Apparatus as in claim 7 wherein each of said first and second openings defines first and second serrated edges and further including:

first and second opposed connecting elements extending between and connecting together said first and second supports;

a first arm member flexibly and resiliently connected to said first connecting element and defining a first serrated surface for removably engaging said first serrated edge of said first opening when said first removable support is within said first opening; and     a second arm member flexibly and resiliently connected to said second connecting element and defining a second serrated surface for removably engaging said second serrated edge of said first opening when said first means is within said first opening.

15. Apparatus as in claim 14 further including:

third and fourth opposed connecting elements extending between and connecting together said first and second support elements;

a third arm member flexibly and resiliently connected to said third connecting element and defining a third serrated surface for removably engaging said first serrated edge of said second opening when said second means is within said second opening; and     a fourth arm member flexibly and resiliently connected to said fourth connecting element and defining a fourth serrated surface for removably engaging said second serrated edge of said second opening when said second means is within said second opening.

16. Apparatus as in claim 1 wherein said belt is comprised of neoprene having a polyurethane coating to provide friction.

17. Apparatus as in claim 1 wherein said first and second openings, said first removable support and said second removable support are configured and sized to permit said first removable support to be adjustably positioned within said first opening in a substantially radial direction with respect to said first axis and to permit said second removable support to be adjustably positioned within said second opening in a substantially radial direction with respect to said first axis, whereby the speed of rotation of said first removable support and said second removable support about said first axis can be adjusted.

\* \* \* \* \*